(12) United States Patent
Pagliarini et al.

(10) Patent No.: US 10,343,325 B2
(45) Date of Patent: Jul. 9, 2019

(54) PRODUCTION APPARATUS OF STERILE RECEPTACLES, A BOTTLING PLANT COMPRISING THE APPARATUS AND A PRODUCTION METHOD OF A STERILE RECEPTACLE

(71) Applicant: GEA PROCOMAC S.P.A., Sala Baganza (Parma) (IT)

(72) Inventors: Paolo Pagliarini, Parma (IT); Luigi Casappa, Mamiano (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 162 days.

(21) Appl. No.: 15/523,431

(22) PCT Filed: Nov. 26, 2015

(86) PCT No.: PCT/IB2015/059154
§ 371 (c)(1),
(2) Date: May 1, 2017

(87) PCT Pub. No.: WO2016/088003
PCT Pub. Date: Jun. 9, 2016

(65) Prior Publication Data
US 2017/0312977 A1 Nov. 2, 2017

(30) Foreign Application Priority Data
Dec. 1, 2014 (IT) .............................. PR2014A0078

(51) Int. Cl.
*B29C 49/46* (2006.01)
*B29C 49/06* (2006.01)
(Continued)

(52) U.S. Cl.
CPC .............. *B29C 49/46* (2013.01); *B29C 49/06* (2013.01); *B29C 49/36* (2013.01); *B29C 33/72* (2013.01);
(Continued)

(58) Field of Classification Search
CPC ......... B29C 49/46; B29C 49/36; B29C 49/06; B29C 49/6409; B29C 2049/023;
(Continued)

(56) References Cited

U.S. PATENT DOCUMENTS 6,119,433 A 9/2000 Kitahora et al.
8,197,245 B2 6/2012 Dordoni
(Continued)

FOREIGN PATENT DOCUMENTS

DE 10115241 A1 10/2002
DE 102007017938 A1 10/2008
(Continued)

*Primary Examiner* — Joseph S Del Sole
*Assistant Examiner* — Lawrence D. Hohenbrink, Jr.
(74) *Attorney, Agent, or Firm* — Pearne & Gordon LLP

(57) ABSTRACT

An apparatus (1) for producing sterile receptacles (2), comprising: a molding unit (13) for molding parisons (4) starting from granules of thermoplastic material; a stretch-blowing forming unit (3) which receives the parisons (4) from the molding unit (13), the forming unit (3) having a plurality of forming stations (5) in each of which there is a mold (6) and a sterilization device (12) so as to form and sterilize the corresponding parison (4).

10 Claims, 11 Drawing Sheets

(51) Int. Cl.
*B29C 49/36* (2006.01)
*B29C 33/72* (2006.01)
*B29C 49/64* (2006.01)
*B29C 45/24* (2006.01)
*B29C 49/02* (2006.01)
*B29C 49/12* (2006.01)
*B29L 31/00* (2006.01)

(52) U.S. Cl.
CPC .......... *B29C 45/24* (2013.01); *B29C 49/6409* (2013.01); *B29C 2033/727* (2013.01); *B29C 2049/023* (2013.01); *B29C 2049/1223* (2013.01); *B29C 2049/4635* (2013.01); *B29C 2049/4679* (2013.01); *B29C 2049/4694* (2013.01); *B29C 2049/4697* (2013.01); *B29L 2031/7158* (2013.01)

(58) Field of Classification Search
CPC .... B29C 2049/1223; B29C 2049/4697; B29C 2049/4679; B29C 2049/4694; B29C 2049/4635; B29C 33/72; B29C 2033/727
USPC ...................................................... 264/523
See application file for complete search history.

(56) References Cited

U.S. PATENT DOCUMENTS

| | | |
|---|---|---|
| 8,435,024 B2 | 5/2013 | Dordoni |
| 8,800,248 B2 | 8/2014 | Imatani et al. |
| 9,056,146 B2 | 6/2015 | Till |
| 9,186,856 B2 | 11/2015 | Pagliarini et al. |
| 9,321,621 B2 | 4/2016 | Kitano et al. |
| 2010/0089009 A1 | 4/2010 | Till |
| 2010/0272844 A1 | 10/2010 | Dordoni |
| 2011/0146202 A1 | 6/2011 | Imatani et al. |
| 2011/0219728 A1 | 9/2011 | Humele |
| 2012/0164258 A1 | 6/2012 | Dordoni |
| 2013/0061557 A1* | 3/2013 | Kitano .................. B67C 7/0073 53/167 |
| 2014/0103584 A1 | 4/2014 | Pagliarini et al. |
| 2016/0001488 A1* | 1/2016 | Clusserath ........... B23K 1/0056 264/525 |
| 2016/0318267 A1* | 11/2016 | Koiso .................... B29C 45/03 |

FOREIGN PATENT DOCUMENTS

| | | | |
|---|---|---|---|
| DE | 102007041573 A1 | 3/2009 | |
| DE | 102013101642 A1 | 8/2014 | |
| EP | 0794903 A1 | 9/1997 | |
| EP | 2246176 A1 | 11/2010 | |
| EP | 2279850 A1 * | 2/2011 | ............ B29C 49/46 |
| EP | 2279850 A1 | 2/2011 | |
| EP | 2324987 A1 | 5/2011 | |
| EP | 2340157 A1 | 7/2011 | |
| EP | 2447026 A2 | 5/2012 | |
| EP | 2578504 A1 | 4/2013 | |
| EP | 2643142 A1 | 10/2013 | |

* cited by examiner

PRODUCTION APPARATUS OF STERILE RECEPTACLES, A BOTTLING PLANT COMPRISING THE APPARATUS AND A PRODUCTION METHOD OF A STERILE RECEPTACLE

TECHNICAL FIELD

The present invention relates to a production apparatus of sterile receptacles, a bottling plant comprising the apparatus and a production method of a sterile receptacle.

The reference sector is the bottling of so-called "sensitive" food products, i.e. products that are particularly sensitive to bacteriological contamination and oxidation, such as, for example, isotonic drinks, juices, nectars, soft drinks, tea, milk-based drinks, coffee-based drinks, etc., for which the prevention of possible microbiological contamination throughout all packaging stages is of fundamental importance.

BACKGROUND ART

Packaging lines using aseptic technology are already known, wherein the various operations take place in a controlled contamination environment, so that the bottled products can be stored for a prolonged period of time and have chemical/physical and organoleptic stability even at room temperature.

Aside from differences in design, a "conventional" aseptic bottling line envisages:
  forming the receptacle starting with a parison made of a thermoplastic material;
  chemical sterilisation of the formed receptacle;
  rinsing, filling and capping of the filled receptacle, to be carried out in a sterile environment.

The main drawback of conventional lines is related to the need to have to sterilise the receptacle once it has been formed and to maintain the sterilised state thereof throughout all subsequent operations, for example the filling and capping operations.

A modern concept of an aseptic bottling line instead envisages:
  sterilisation of the parison using chemical agents or radiation sterilisation;
  "aseptic" forming of the receptacle starting with the sterilised parison;
  filling and capping of the filled receptacle, to be carried out in a sterile environment.

In this regard, the Applicant has developed a forming apparatus for forming under aseptic conditions, in which the rotary forming carousel is protected by an isolation device suitable for defining a controlled contamination environment, and the movement means for moving the carousel and moulds is located outside of isolation device (see European Patent EP2246176).

The preliminary sterilisation stage involves all devices that come into contact with the parison subjected to forming by stretch-blowing, including for example the picking members, the stretching rod and the blown air circuit. The Applicant has thus developed ad hoc solutions for the stretching rod (see European Patent no. EP2340157) and for the blown air circuit (see European Patent EP2643142).

In this way the Applicant has developed a completely aseptic blowing machine and a bottling line in which the process zone of each operating unit is protected by a dedicated microbiological isolator, from which the movement and manipulating means of parisons/receptacles is excluded (see European Patent EP2279850). The main drawback of this solution clearly lies in its considerable structural complexity.

It should also be added that not all the manual procedures required during operation (e.g. removal of obstacles) can be performed with the use of handling gloves: in some cases it is necessary to open the access door of the isolator, with a consequent loss of sterility. Upon completion of the procedure, a sterile environment must be restored, resulting in an evident loss of time due to downtime of the line.

The above-mentioned solutions, as well as the structural complexity, are able to ensure maintaining the sterility inside the bottling line which receives the parisons in inlet.

In an aseptic line the sterilisation performances of the receptacles and the closures are expressed by the number of D-value reductions which the sterilisation treatment is able to carry out on a reference microorganism. For example, for aseptic lines which package low-acidity products six D-value reductions are generally requested, while in lines treating high-acidity products four D-value reductions are sufficient.

The sterilisation specifications are very stringent as they take into account events of accidental contamination of an extraordinary nature. On the other hand, in the production process going from the raw material (PET granules) to the formed and capped receptacle there are some passages in which the contamination level is not under control.

In fact, the production of the formed parisons is done in dedicated facilities (known in the sector as converters) starting from the PET granules, which are melted so as to shift the plastic into the viscous state, which is then injected into the moulds of appropriate machines (presses).

In outlet from the press, the parisons are collected in octabins, i.e. cardboard packs having prismatic shape with an octagonal base, which are transported into the bottling facility, where they are stored in a special store. In harmony with the production rate, the octabins are opened and the parisons are tipped loosely into a hopper, in order then to pass to an ordering unit which orientates them with the mouth upwards and supplies them to a machine forming the receptacles (known in the sector as a "blower").

It is therefore clear that in all steps upstream of the aseptic bottling line the parisons are potentially exposed to high risks of contamination, due both to the manual interventions by the operator (e.g. manual packing of the parisons in the octabins or tipping the parisons into the hopper) or to the damage to the octabins during transport and storage.

It is exactly this absence of control of the contamination in these steps that does not allow for any loosening of the sterilisation performances mentioned above.

However, guaranteeing four or six D-value reductions has a substantial effect on the complexity and the overall volume of the aseptic line, among other things increasing production costs.

For these reasons, in recent years some producers have developed solutions which involve the production of parisons upstream of the packaging line, in the same facility.

The integration of the moulding press of the parisons in the bottling line has however set constraints due to the fact that the press is a machine functioning alternatingly, working on molten plastic material that is very delicate to manage. Further, the press has format-change operations that are rather laborious and long.

For example, document EP2578504 illustrates an aseptic filling system in which all the operating units, including the parison moulding press, are located in a clean chamber. Each operating unit is further contained in a dedicated cabin at higher pressure than that of the clean chamber in such a way as to guarantee a degree of purity that is greater inside the cabin. The operator is afforded access to each cabin in the line.

Similar solutions are also described in documents US2011/0219728 (see in particular the embodiment illustrated in FIG. 2 of that document), EP0794903 and EP2324987.

In this way, reference is explicitly made to the need to sterilise the internal surfaces of the clean chamber and the external surfaces of the cabins/boxes containing the single operating units.

The main drawback of these solutions integrating the moulding press of the parison inside the aseptic line is connected to the increase of the volumes and surfaces to be sterilised before start-up and to the increase in the volumes to be maintained sterile during production.

This means a complication of all the activities involved with sterilising and managing the line. Further the cleaning and sterilising time cycles are lengthened.

A further drawback is due to the increase in complexity of the press in order for it to be compatible with the production rate of the downstream units. For example, document EP2578504 relates to a temporary storage buffer of the parisons between the press and the blower.

In this context the technical task underpinning the present invention is to provide a production apparatus of sterile receptacles, a bottling plant comprising the apparatus and a production method of a sterile receptacle, which obviate the drawbacks of the prior art as cited in the foregoing.

DISCLOSURE OF THE INVENTION

In particular, an aim of the present invention is to make available a production apparatus of sterile receptacles having a smaller volume, a simplified structure and lower costs with respect to known solutions.

A further aim of the present invention is to provide a production apparatus of sterile receptacles which is easier and more rapid to clean and sterilise.

A further aim of the present invention is to provide a production method of a sterile receptacle in which the washing and sterilising times of the receptacle are shortened, the maintaining of the sterility operations are simplified and the operating costs are therefore reduced.

A further aim of the present invention is to provide a bottling plant in which the sterility performances are more relaxed with respect to known solutions, i.e. the number of critical parameters monitoring the maintaining of the aseptic conditions is reduced.

The defined technical task and the specified aims thereof are substantially achieved by a production apparatus of sterile receptacles comprising:
- a stretch-blowing forming unit having a plurality of forming stations in each of which two half-moulds are arranged that can be moved towards one another to define at least one housing cavity for housing a parison made of thermoplastic material;
- a moulding unit for moulding parisons starting from granules of thermoplastic material, the moulding unit being placed upstream of said forming unit;
- a plurality of sterilisation devices, each of which is situated in one of the forming stations so as to sterilise the parisons that arrive in the corresponding housing cavities.

The moulding unit of the parisons preferably comprises:
- a plurality of moulding stations in each of which a mould is arranged comprising a concave portion and a convex portion insertable in the concave portion;
- means for cleaning the surfaces of the moulds adapted to come into contact with the parisons.

The cleaning means preferably comprises nozzles for dispensing a washing liquid which are arranged to as to dispense jets of washing fluid at least onto the outer surfaces of the convex portions of the moulds.

The moulds of the moulding unit are preferably of the injection or compression or injection-compression type.

Each sterilisation device preferably comprises a plasma generator operatively active on the corresponding housing cavity.

Each sterilisation device alternatively consists of a nozzle for nebulising a sterilising liquid, said nozzle pertaining to the corresponding housing cavity so as to treat the parison contained therein.

A thermal conditioning unit is preferably present, interposed between the moulding unit and the forming unit so that the parisons leaving the thermal conditioning unit have a predefined thermal profile adapted to allow forming by stretch-blowing.

The moulding unit and the thermal conditioning unit are preferably arranged in an ultra-clean environment, i.e. in a volume that is separated from the external environment by means of a physical separation that has the purpose of limiting the entrance of contaminants from the external environment.

The stated technical task and specified objects are substantially achieved by a bottling plant, comprising:
- the production apparatus of sterile receptacles of the present application;
- a filling apparatus of formed receptacles comprising a plurality of filling stations and the same number of filling nozzles each of which nozzles is positioned at one of the filling stations;
- a closing apparatus of filled receptacles comprising a plurality of closing stations and the same number of closing heads each of which is positioned at one of the closing stations.

The filling apparatus preferably comprises a first isolator adapted to define a first controlled contamination environment having a volume extending from the filling nozzles to the position assumed by the necks of the receptacles in the filling stations.

The closing apparatus preferably comprises a second isolator adapted to define a second controlled contamination environment having a volume extending from the closing heads to the position assumed by the necks of the receptacles in the closing stations.

In a preferred embodiment, the closing apparatus comprises:
- an application unit of closures configured to rest and press onto each receptacle a concave closure;
- a tightening unit for tightening the closures configured to screw each concave closure to the neck of the corresponding receptacle, said application unit for applying the closures comprising a third isolator adapted to define a third controlled contamination environment having a volume that extends into a narrow zone inside the neck of the receptacles.

The tightening unit is preferably a non-aseptic capper.

The defined technical task and the specified objects thereof are substantially achieved by a process for making baked products comprising the following steps:

obtaining a parison by melting and moulding granules made of a thermoplastic material;

inserting the parison into a first mould;

sterilising the parison when the parison is in the first mould;

blowing a fluid into the parison and at the same time elongating the parison by introducing a stretching rod into the parison, The step of obtaining the parison preferably comprises sub-steps of:

moulding the molten granules inside a second mould constituted by a concave portion and a convex portion insertable in the concave portion;

cleaning the surfaces of the second mould adapted to come into contact with the parison.

BRIEF DESCRIPTION OF DRAWINGS

The step of cleaning the surfaces of the second mould is preferably performed periodically at pre-established and settable time intervals.

Further characteristics and advantages of the present invention will more fully emerge from the non-limiting description of a preferred but not exclusive embodiment of a production apparatus of sterile receptacles, a bottling plant comprising the apparatus and a production method of a sterile receptacle, as illustrated in the accompanying drawings, in which.

DETAILED DESCRIPTION OF PREFERRED EMBODIMENTS OF THE INVENTION

Figure 1:
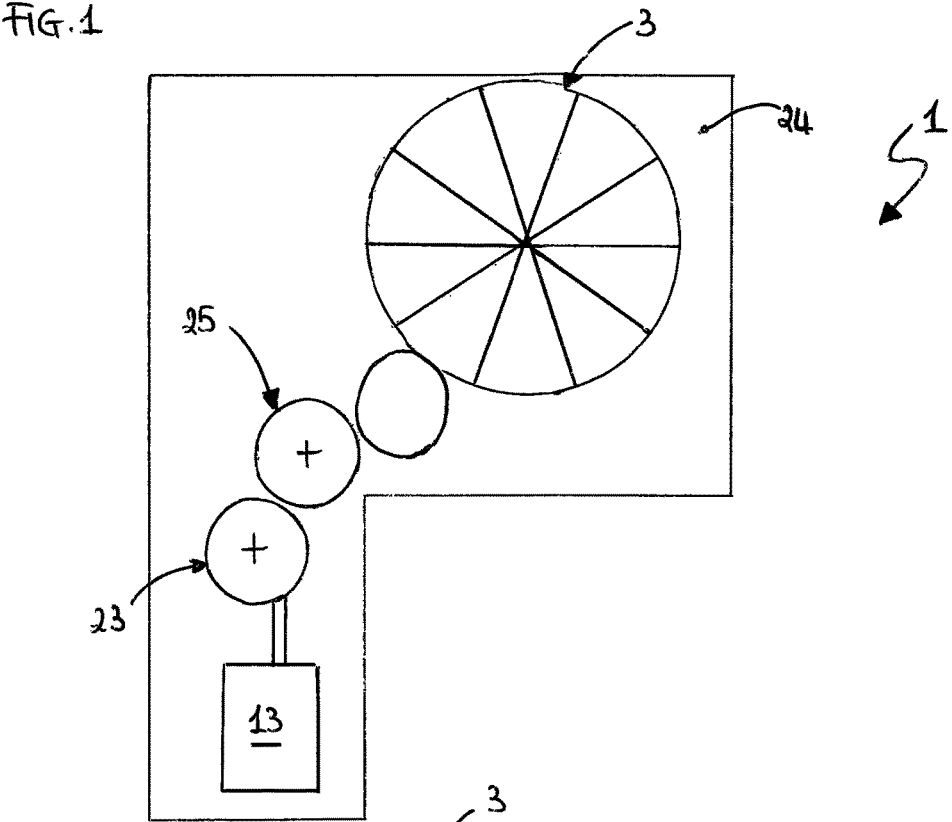
FIG. 1 illustrates a production apparatus of sterile receptacles, according to the present invention, in a schematic plan view.
Figure 2:
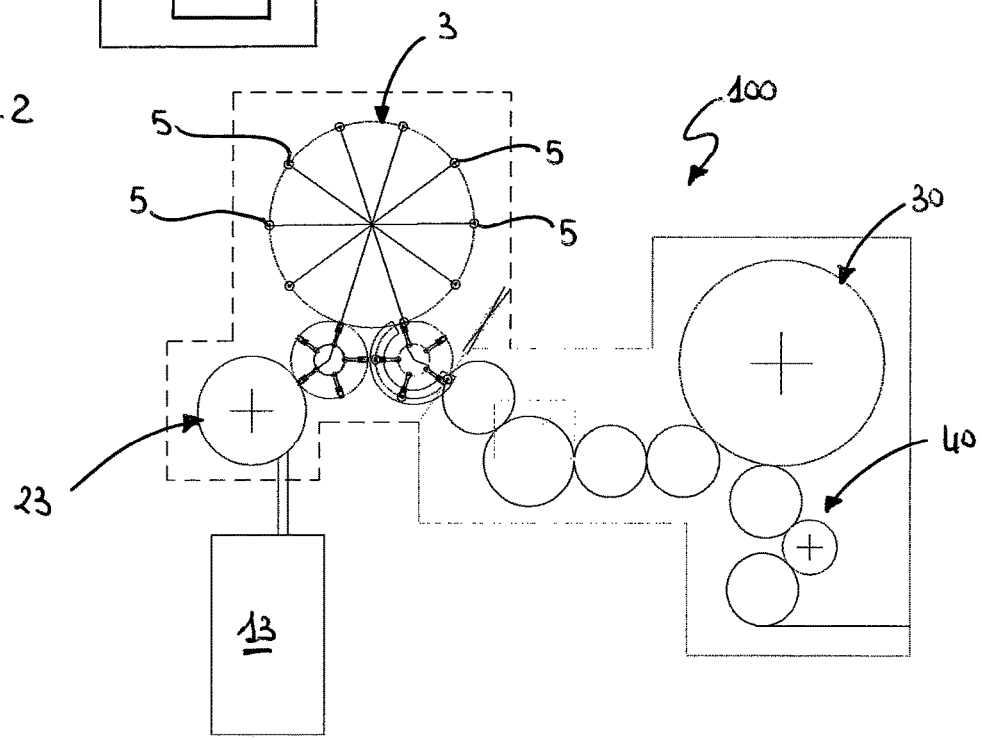
FIG. 2 illustrates a bottling plant, according to the present invention, in a schematic plan view.
Figure 3:
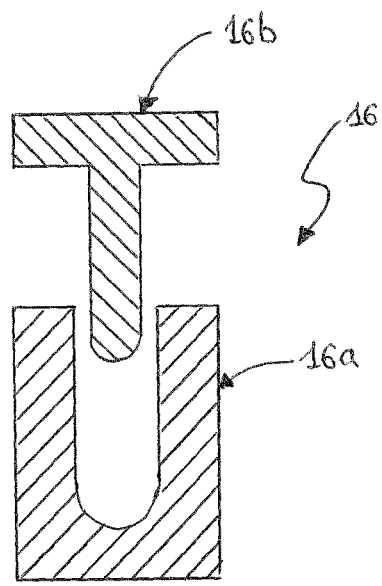
FIG. 3 illustrates a mould (second mould) of the moulding unit of the production apparatus of sterile receptacles of FIG. 1, in an exploded section view.
Figure 4:
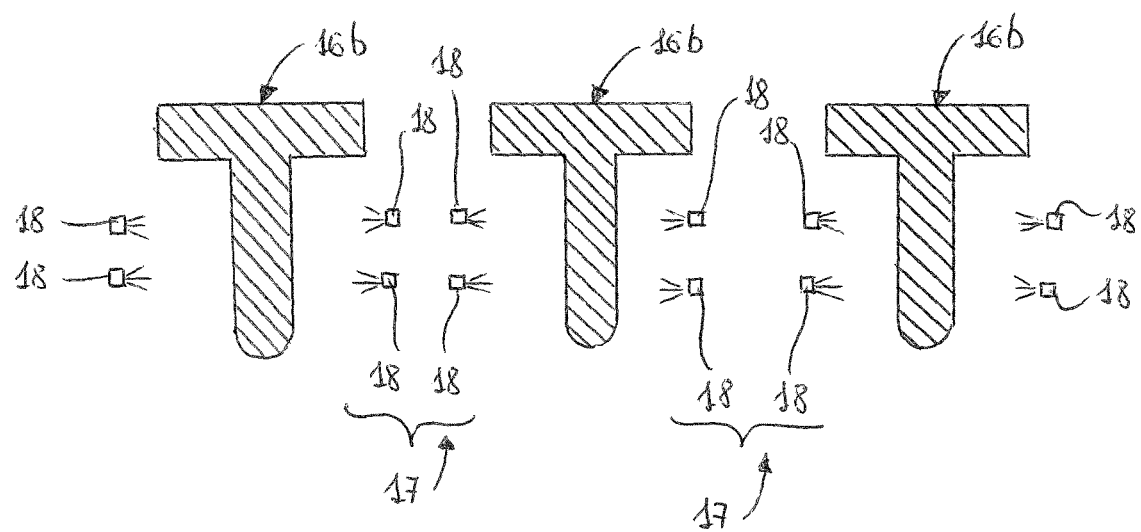
FIG. 4 schematically illustrates a part (males of the second moulds and cleaning means) of the moulding unit of the production apparatus of sterile receptacles of FIG. 1.
Figure 5:
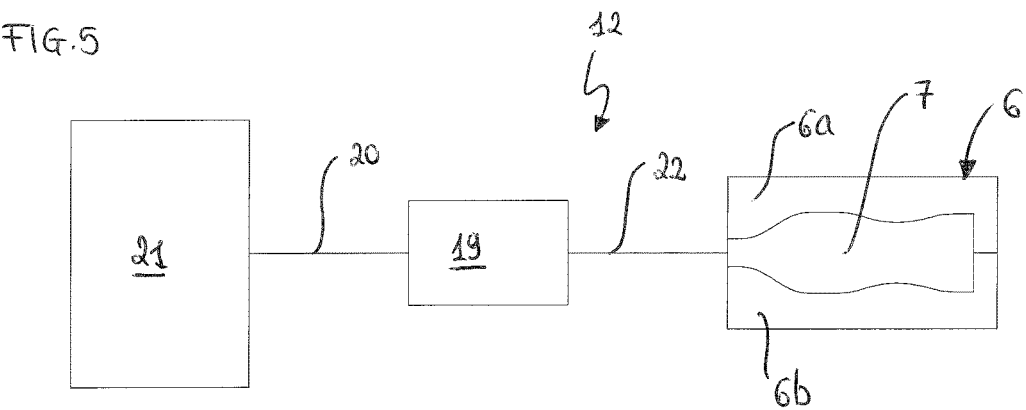
FIG. 5 is a block diagram of a first embodiment of a sterilisation device applied to a forming mould (first mould) of the production apparatus of sterile receptacles of FIG. 1, in a first embodiment.

With reference to the figures, number 1 denotes a device for producing sterile receptacles 2.

The apparatus 1 comprises a forming unit 3 for stretch-blowing receptacles 2 from parisons 4 made of thermoplastic material, preferably PET.

The forming unit 3 is preferably of the rotary carousel type. Alternatively, the forming unit 3 may be of the linear type.

The parison 4 preferably has a tubular body 4a and a neck 4b that does not undergo the moulding process. For this reason, in the following description the reference number 4b will be used to denote also the neck of the formed receptacle 2.

The forming unit 3 comprises a plurality of forming stations 5 in each of which a mould 6 is arranged comprising two half-moulds 6a, 6b or semi-portions.

In particular, the half-moulds 6a, 6b of each mould 6 are relatively mobile one with respect to the other at least between a first configuration in which they are joined so as to define at least a housing cavity 7 of a parison 4 and a second configuration in which they are distanced so as to enable introduction of the parison 4 into the mould 6, or the disengagement of the formed receptacle 2.

The half-moulds 6a, 6b of each mould 6 are preferably hinged to one another so as to rotate about a common joint axis.

For example, each mould 6 is of a "book" type. Alternatively, each mould is of an "alligator" type.

In a further variant, each mould 6 is of a linear type, i.e. the half-moulds 6a, 6b are reciprocally movable by translation.

In each mould 6 the two half-moulds 6a, 6b are preferably internally shaped so as to reproduce the profile of the flanks of the receptacle 2 to be obtained.

Each mould 6 is preferably provided with a bottom cooperating with the two half-moulds 6a, 6b so as to shape the interior part (bottom) of the receptacle 2 to be obtained.

Figure 8:
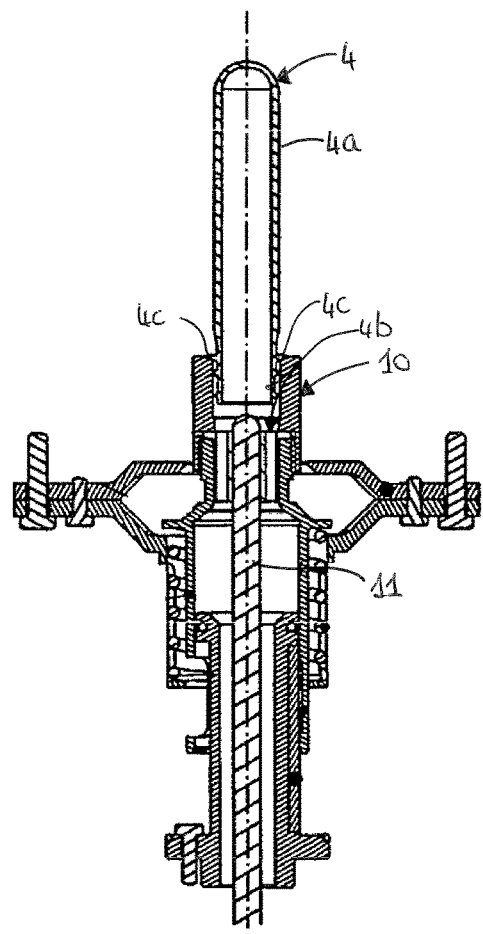
FIG. 8 illustrates some elements (seal and stretching rod) present in a forming station for stretch-blowing of the production apparatus of sterile receptacles of FIG. 1.

Each moulding device 6 preferably further comprises a blowing nozzle 10 (or seal) and a stretching rod 11 (see FIG. 8). In particular, the stretching rod 11 is progressively insertable in the parison 4 to stretch it.

In particular, the blowing nozzle 10 is applied on the neck 4b of the parison 4 in such a manner as to abut and create a tight seal on a transverse protrusion 4c (known in the field by the technical term "finish") of the neck 4b in order to blow a fluid into it.

In particular, the blowing nozzle 10 creates a seal on the finish 4c so as to close the mouth 4d of the parison 4 in a tightly sealed manner during the forming. In the following description the reference number 4d will be used to denote also the mouth of the formed receptacle 2.

Originally in each forming station 5 there is a sterilisation device 12 operatively active on the parison 4 that has reached the corresponding housing cavity 7.

Originally, upstream of the forming unit 3 there is a moulding unit 13 of the parisons 4 starting from granules of thermoplastic material (for example PET).

The moulding unit 13 of the parisons 4 preferably comprises a plurality of moulding stations in each of which a mould 16 is arranged constituted by a concave portion 16a (also termed a female) and a convex portion 16b (also termed a male) insertable in the concave portion 16a.

For reasons of clarity of explanation, we will use the expression "first moulds" for the moulds 6 of the forming unit 3 and the expression "second moulds" for the moulds 16 of the moulding unit 13.

Preferably the moulding unit 13 is a traditional-type machine with alternating cycles with the second moulds 16 of the injection type.

Alternatively, the moulding unit 13 is a continuous-type rotary machine with the second moulds 16 being of the compression type or the injection-compression type.

The moulding unit 13 comprises cleaning means 17 for cleaning the surfaces of the second moulds 16 which are adapted to come into contact with the parisons 4.

The cleaning means 17 preferably comprises nozzles 18 for dispensing a washing liquid which are arranged to as to dispense jets of washing liquid at least onto the outer surfaces of the convex portions 16b of the moulds 16. In fact, the external surfaces are destined to come into contact with the inside of the parisons 4.

The dispensing nozzles 18 are preferably arranged so as to dispense the washing fluid also on the internal surfaces of the concave portions 16a, which contact the parisons 4 externally. In a further embodiment, the dispensing nozzles 18 are arranged so as to dispense the washing fluid also on the internal surfaces of the parisons 4, thus decontaminating them. For example, the washing fluid is isopropyl alcohol which, having a high steam tension, evaporates easily and has an anti-adhesive effect.

In an embodiment, the cleaning means 17 is the means for applying dry ice on the surfaces of the second moulds 16 which are adapted to come into contact with the parisons 4.

The moulding unit 13 is preferably arranged in an ultra-clean environment 24. In this context, by ultra-clean environment is meant a volume that is separated from the external environment (dirty) by means of a physical confine that has the purpose of limiting the entrance of contaminants from the external environment. In particular, the physical confinement does not necessarily have to be under seal. For example, the ultra-clean environment 24 is maintained at an overpressure of about 10 Pa. In order to generate this overpressure microfiltered air flows are preferably used created by appropriate devices (HEPA filters, for example level H13). The predisposing of the ultra-clean environment 24 has the aim of limiting the contamination of the parisons 4.

The apparatus 1 preferably comprises a thermal conditioning unit 23, interposed between the moulding unit 13 and the forming unit 3 so that the parisons 4 leaving the thermal conditioning unit 23 have a predefined thermal profile adapted to allow forming by stretch-blowing. In fact, at the outlet of the moulding unit 13 the parisons 4 have a temperature of about 100° C., so it is preferable to have a step of thermal profiling for creating a temperature gradient along the axis of the parisons 4 so as to make the parisons 4 suitable for forming by stretch-blowing.

For example, the thermal conditioning unit 23 is of an infrared or microwave type.

The thermal conditioning unit 23 is also preferably in the ultra-clean environment 24.

A decontamination unit 25 of the parisons 4 is preferably included, interposed between the moulding unit 13 and the forming unit 3. In particular, the decontamination unit 25 is designed for packaging low acidity products, which normally require six D-value reductions.

In particular, the decontamination unit 25 is configured for introducing a thermally-activatable sterilising agent inside the parisons 4.

In particular, the thermal activation is achieved by the temperature reached by the parisons 4 in outlet from the moulding unit 13.

In a further embodiment, the decontamination unit 25 is integrated with the thermal conditioning unit 23.

In a first embodiment, each sterilisation device 12 comprises a plasma generator 19 operatively active on the corresponding housing cavity 7.

Figure 6:
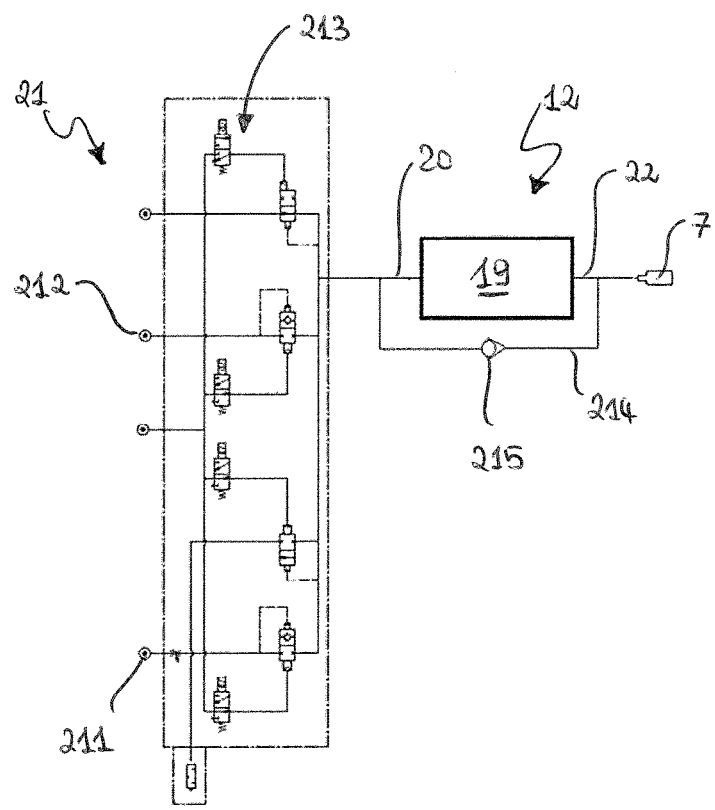
FIG. 6 is a block diagram of the sterilisation device of FIG. 5, with a detail of the circuit of the supply means for supplying the blowing fluid.
Figure 7:
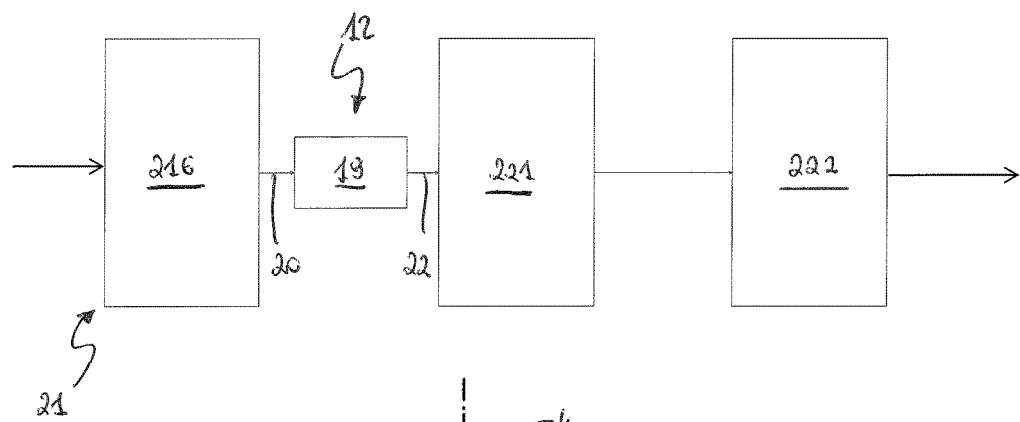
FIG. 7 is a partial block diagram of a variant of the sterilisation device of FIG. 5.

As illustrated in FIGS. 6-7, the plasma generator 19 is situated outside the housing cavity 7 and relates to the cavity 7 so as to blow plasma into the parison 4 contained therein.

In particular, the plasma generator 19 has an inlet 20 receiving a blowing fluid at a pressure higher than the atmospheric pressure and an outlet 22 adapted to dispense plasma at a pressure higher than the atmospheric pressure to the corresponding blowing nozzle 10. In this way, the plasma is blown into the parison 4 located in the corresponding housing cavity 7, which is thus formed and sterilised.

In this context, sterilisation is understood as both the total elimination of microorganisms and the reduction of microorganisms (in this latter case, it is also a matter of "decontamination") present on the parison.

The blowing fluid (for example air) is provided by supply means 21 of a known type.

The plasma forming can take place partially, that is, by sending plasma at a maximum pressure of about 16 bar (pre-blowing phase) or by sending plasma until the forming is completed (pre-blowing phase and the actual blowing phase).

According to what is illustrated in FIG. 6, the supply means 21 for supplying the blowing fluid comprises:

a primary line 211 enabled to transport blowing fluid at a maximum pressure of around 16 bar;

a secondary line 212 enabled to transport blowing fluid at a maximum pressure of around 40 bar;

a valve unit 213 configured to place the primary line 211 and the secondary line 212 in selective communication with the inlet 20 of the plasma generator 19.

For example, the plasma generator 19 is interposed between the valve unit 213 and the blowing nozzle 10.

The plasma generator 19 is preferably positioned near the blowing nozzle 10.

Alternatively, the plasma generator 19 is integrated in the valve unit 213.

A discharge line 214 also shown in FIG. 6 is enabled to set the valve unit 213 in communication with the housing cavity 7. This discharge line 214 is provided with a non-return valve 215 and it is placed in parallel with the plasma generator 19 in order to evacuate residual gas quickly from the inside of the receptacle 2 once the forming of the receptacle is completed.

The plasma generator 19 is not in itself an object of the present invention. However, it is worthwhile specifying that the structural design chosen for the plasma generator 19 must be capable of operation with inlet pressures of up to about 40 bar (in fact, the blowing fluid coming from the secondary line 212 reaches these pressure levels).

It is a known fact that an increase in the pressure of the incoming fluid makes it more difficult to activate the plasma because it increases the resistance of the fluid (which functions as a dielectric) to the discharge. Therefore, the voltage to be applied between the electrodes to activate high inlet pressures would even be in the range of about 20-30 kV.

To meet the need for operation with pressures of about 40 bar, a plasma torch (or gun) can be employed as a plasma generator 19; the torch supplies as output a direct flow of plasma from a nozzle. In particular, the plasma generator 19 consists in the plasma torch described in patent no. DE 10115241.

In this torch, the plasma is activated at a pressure lower than the initial inlet pressure, owing to the presence of a convergent element. Subsequently, the pressure is brought back to its initial level by means of a divergent element. Through the use of this torch in the first embodiment, the plasma can be activated at pressures within the range of 6-8 bar even in the presence of an inlet blowing fluid in the range of about 30-40 bar.

An automatic system of the "mobile plug" type can the integrated in the plasma torch of patent DE 10115241 with the aim of adapting it to the pressure level of the incoming fluid. This system changes the geometry of the elements from convergent to divergent and vice versa. In this manner, the plasma is generated independently of the inlet fluid pressure level.

Moreover, the torch disclosed in patent DE 10115241 has an added inlet for an additional fluid (for example water vapour or nitrogen) for the purpose of modifying the characteristics of the plasma to make it suitable for use in blowing the parison 4.

According to what is illustrated in FIG. 7, the supply means 21 for supplying the blowing fluid comprises:
  at least one compression stage 216 for the fluid, enabled to generate the blowing fluid;
  a plasma distribution circuit, which receives the plasma (directly or indirectly) from the outlet 22 of the plasma generator 19, and which, in turn, comprises a primary line to transport plasma having a maximum pressure of around 16 bar and a secondary line to transport plasma having a maximum pressure of around 40 bar;
  a valve unit configured to place the primary line and the secondary line in selective communication with the blowing nozzle 10.

In the embodiment illustrated in FIG. 7, the compression stage 216 of the fluid is placed upstream of the plasma generator 19.

For example, there is a single compression stage 216 and it generates blowing fluid having a maximum pressure of about 40 bar. As an alternative, there may be a number of compression stages in a cascade arrangement that are able to generate blowing fluid having a maximum pressure of about 40 bar. As the production of plasma takes place with the pressures of about 40 bar, the plasma distribution circuit receives the plasma directly from the outlet 22 of the plasma generator 19.

Given the high pressure of the blowing fluid supplied at the inlet 20 of the plasma generator 19, the torch disclosed in patent no. DE 10115241, integrated with a mobile plug, can be employed as the plasma generator 19 in this second embodiment as well.

In a preferred variant, the compression stage 216 generates blowing fluid having a pressure of about 8 bar. In this case, it is sufficient to employ a plasma generator capable of operating with relatively low inlet pressures.

In this preferred variant, one or more plasma compression stages 221, 222 are present downstream of the plasma generator 19 and they receive the plasma from the outlet 22 of the plasma generator 19 and compress it to a maximum pressure of about 40 bar.

For example, two plasma compression stages 221, 222 are illustrated in FIG. 7 in a cascade arrangement:
  a first stage 221 capable of compressing the plasma up to a maximum pressure of about 20 bar;
  a second stage 222 capable of compressing the plasma up to a maximum pressure of about 40 bar.

In this preferred variant, the plasma distribution circuit receives the plasma indirectly from the outlet 22 of the plasma generator 19, that is, passing through the first stage 221 and the second stage 222.

Figure 9:
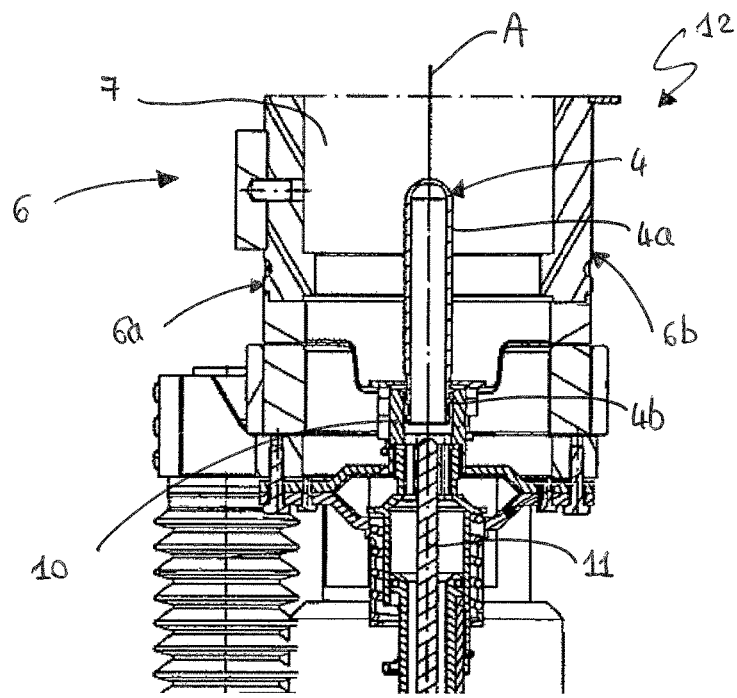
FIG. 9 is a section view of the sterilisation device of the production apparatus of sterile receptacles of FIG. 1, in a second embodiment.
Figure 10:
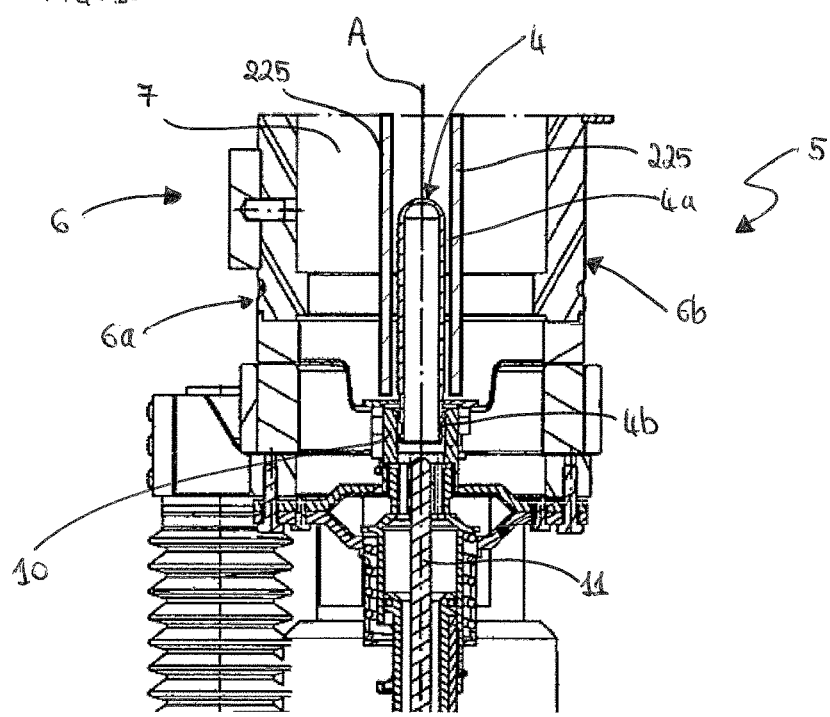
FIG. 10 is a section view of a further embodiment of the sterilisation device of FIG. 9.

In a second embodiment, illustrated in FIGS. 9-10, each sterilisation device 12 comprises a pair of electrodes between which a potential difference is applied that determines generation of plasma inside the corresponding housing cavity 7.

In this embodiment, each stretching rod 11 is partially or entirely made of metal material.

For each sterilisation device 12 the pair of electrodes is therefore formed by the corresponding stretching rod 11 and by a hollow body made at least partially of a metal material and dimensioned such as to be able to at least partially envelop the parison 4 located in the housing cavity 7.

The means for applying a voltage difference between the stretching rod 11 and the hollow body is of known type.

If the plasma is generated by the fluid (air) already present in the housing cavity 7, it is at atmospheric pressure.

If the plasma is generated by the blown fluid, it has a pressure equal to or higher than atmospheric pressure (in that it is obtained starting from a fluid having a pressure equal to or higher than the atmospheric pressure).

For example, the hollow body is obtained by joining the two half-moulds 6a, 6b in the first configuration, which two half-moulds entirely envelop the tubular body 4a of the parison 4. In other words, the hollow body is provided by the union of the two half-moulds 6a, 6b in the first configuration. The two half-moulds 6a, 6b are preferably made entirely of metal material.

Given that the voltage difference is applied between the stretching rod 11 and the half-moulds 6a, 6b in the first configuration, the plasma is generated inside the housing cavity 7 for the parison 4. Further, as the seal 10 is at the same potential as the two half-moulds 6a, 6b, the plasma is also generated in the external zone of the neck 4b of the parison 4.

The voltage difference required between the stretching rod 11 and the two joined half-moulds 6a, 6b can preferably reach a value of about 30 kV.

In an embodiment, illustrated in FIG. 10, the hollow body is a body 225 that is substantially tubular in shape. This hollow tubular body 225 is therefore separate from the two half moulds 6a, 6b.

The hollow tubular body 225 is preferably movable inside the housing cavity 7 at least between an operating position, in which it partially or entirely envelops the tubular body 4a of the parison 4, and a rest position, in which it is moved away from the parison 4.

Movement means (not illustrated) is preferably included for moving the hollow tubular body 225, which movement means is operatively active on the hollow tubular body 225 in order to bring it from the rest position to the operative position, and vice versa.

In particular, the movement means is operatively active on the hollow tubular body 225 to move it linearly along the longitudinal axis A of the housing cavity 7.

The hollow tubular body 225 is preferably coaxial with the housing cavity 7. In particular, when the hollow tubular body 225 is in the operating position, it is coaxial with the tubular body 4a of the parison 4.

For example, the hollow tubular body 225 is formed from a substantially continuous metal sheet. Alternatively, the hollow tubular body 225 is formed from a metal sheet having a plurality of holes or through openings. An additional variant comprises a hollow tubular body 225 consisting of a metal cage formed from a mesh or a plurality of parallel spaced bars.

In a third embodiment, not illustrated, each sterilisation device 12 consists of a nebulizing nozzle. In particular, the nebulizing nozzle sends a sterilising means to the corresponding housing cavity 7, so as to treat the parison 4 housed therein. For example, the sterilisation means is a sterilising fluid in gaseous phase obtained by vaporizing an aqueous compound containing a sterilising agent such as hydrogen peroxide or peracetic acid. Preferably, the concentration of hydrogen peroxide in the aqueous compound is about 35%.

Figure 11:
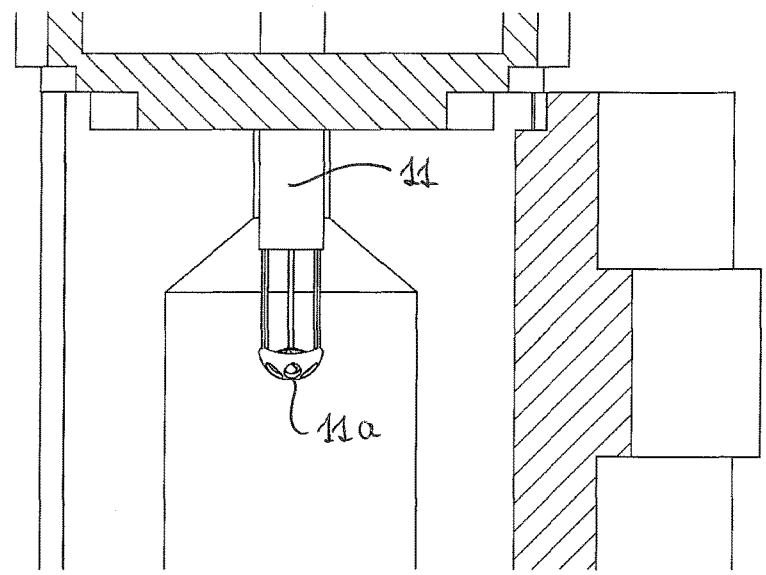
FIG. 11 is a detail of the sterilisation device of the production apparatus of sterile receptacles of FIG. 1, in a fourth embodiment, in a partly sectioned front view.

In a fourth embodiment, illustrated in FIG. 11, each stretching rod 11 is a hollow tubular element having a first end 11a that is holed (the end facing towards the parison 4).

In this embodiment, each sterilisation device 12 comprises a generator of radiations (not illustrated) able to emit radiations inside the corresponding stretching rod 11. These radiations thus cross the internal cavity of the stretching rod 11 and exit from the holed first end 11a thereof.

In particular, the radiation generator is an emitter of directly-ionizing radiations (for example electrons) or indirectly-ionizing radiations (for example X rays), or it is a non-ionizing radiations emitter (for example infrared, ultraviolet or visible light rays).

The manipulation of the parisons 4 inside the apparatus 1 preferably occurs by means of picking organs 14, 15 which are operatively active only on the outside of the parisons 4.

Figure 12A:
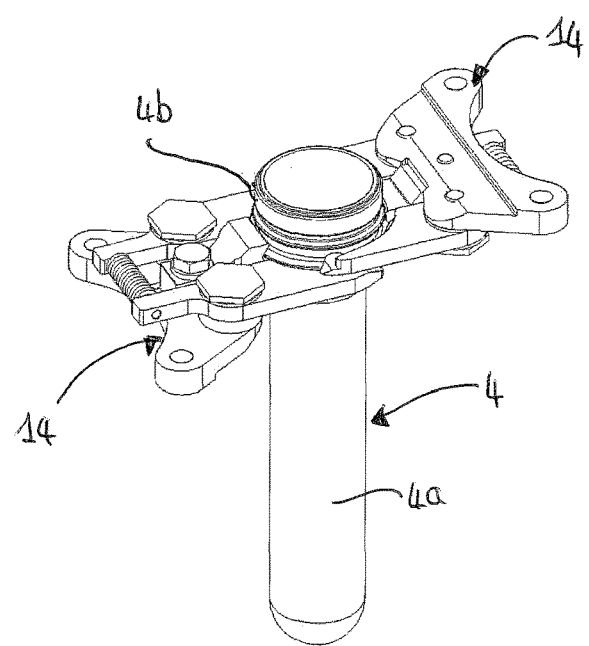
FIGS. 12a-12e illustrate picking organs acting on a parison, in various views.
Figure 12B:
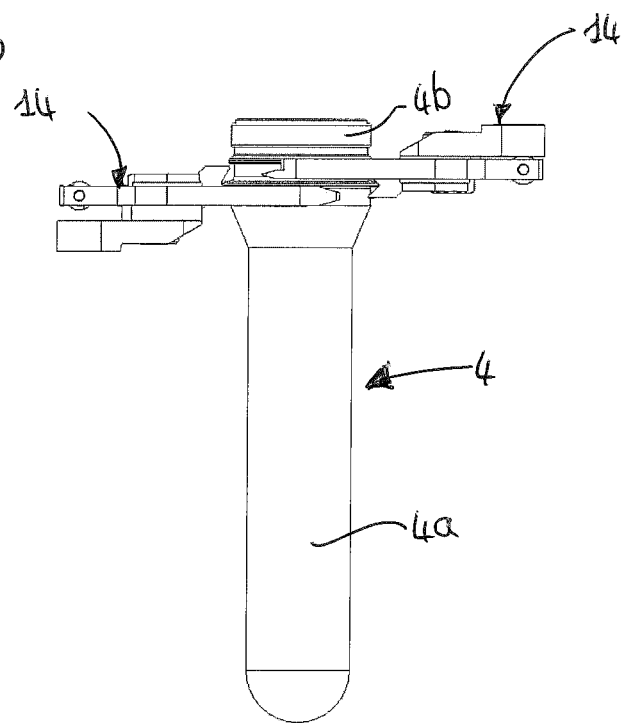
Figure 12C:
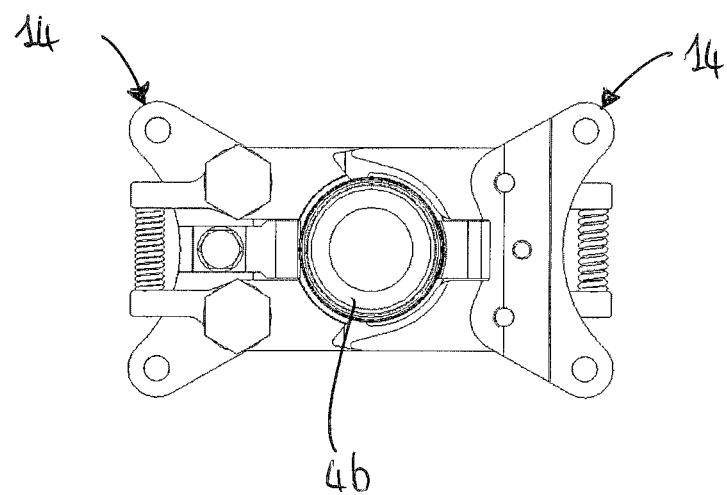
Figure 12D:
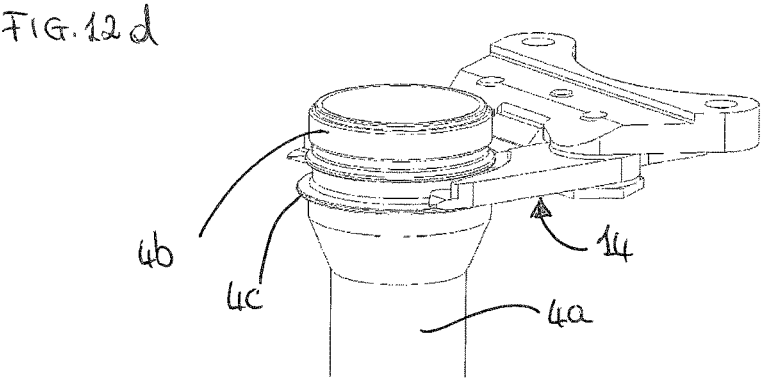
Figure 12E:
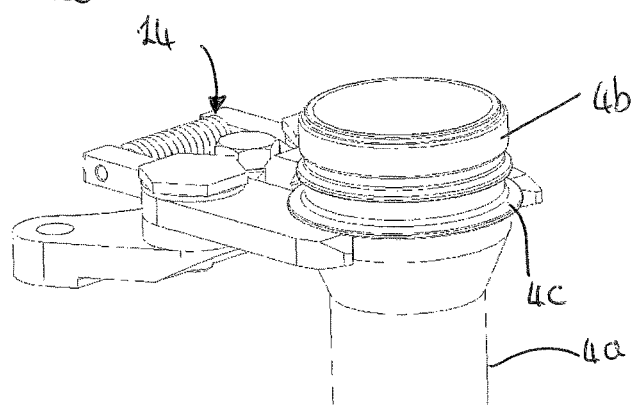

For example, the picking organs consist in grippers 14 operatively active on the neck 4b of the parisons 4. As illustrated in FIGS. 12d-12e, the grippers 14 grip the parison 4 laterally on the neck 4b, abutting either above or below the finish 4c.

Figure 12F:
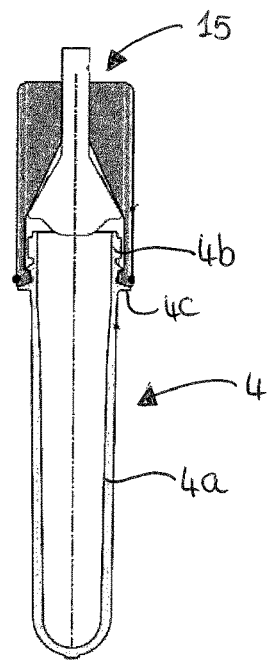
FIG. 12f illustrates a variant of the picking organ of FIGS. 12a-12e, in a sectioned lateral view.

In an embodiment, illustrated in FIG. 12f, the picking organ consists of a picking head 15 which grips the neck 4b of the parison 4 from above, abutting above the finish 4c.

In a further embodiment (not illustrated), the picking organs consist of cells or compartments of a transfer star conveyor.

Reference number 100 denotes a bottling plant, comprising:
the above-described apparatus 1 for producing sterile receptacles 2;
a filling apparatus 30 of the formed receptacles 2;
a closing apparatus 40 of the filled receptacles 2.

In particular, the filling apparatus 30 comprises a plurality of filling stations 35, in each of which a filling nozzle 36 is arranged.

Preferably, the filling apparatus 30 is of the rotating carousel type. Alternatively, the filling apparatus 30 may be of a linear type.

The filling apparatus 30 preferably comprises a first isolator 37 for defining a first controlled contamination environment 38 having a volume extending from the filling nozzles 36 to the position assumed by the neck 4b of the receptacles 2 in the filling stations 35.

Figure 13:
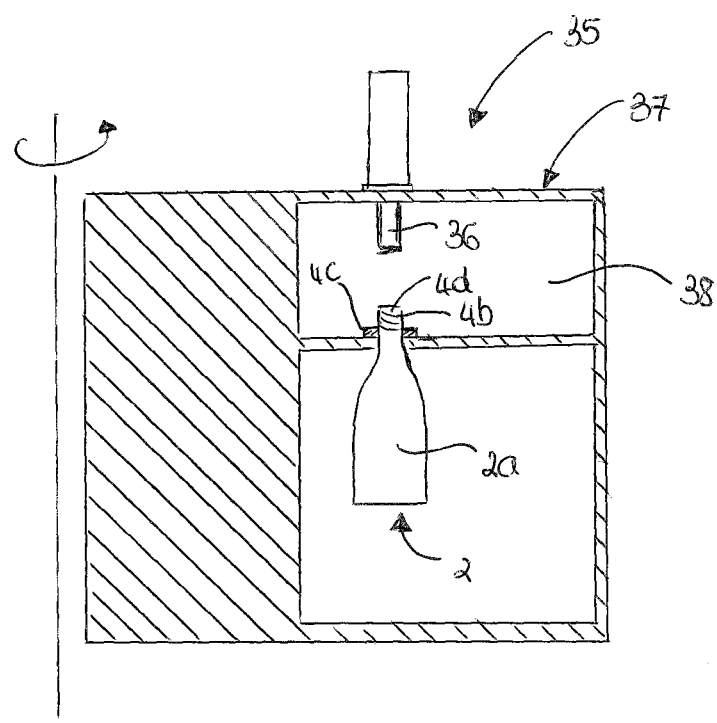
FIG. 13 illustrates a filling station of the bottling plant of FIG. 2, in a partly sectioned view.

In particular, the first controlled contamination environment 38 extends up to containing the finish 4c of the receptacles 2 while the body 2a of the receptacles 2 is outside the first environment 38, as illustrated in FIG. 13. The closing apparatus 40 comprises a plurality of closing stations 45, in each of which a closing head 46 is arranged.

Figure 17:
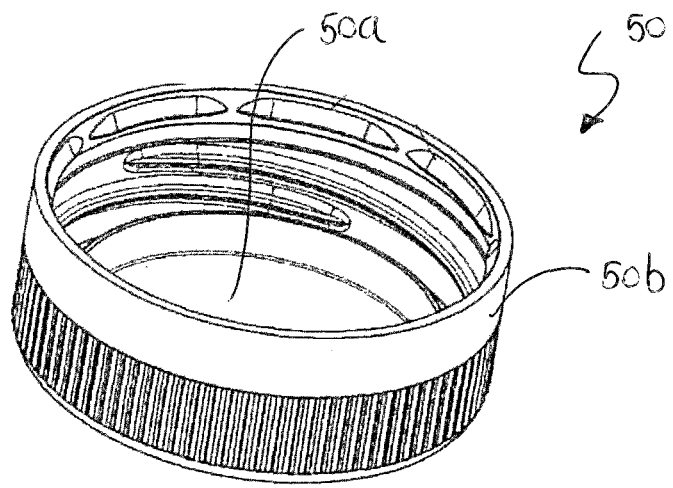
FIG. 17 illustrates a concave closure to be applied to a receptacle.

Each closing head 46 is configured for applying and blocking a concave closure 50 on the corresponding receptacle 2. In this context, by concave closure 50 is meant a capsule or a cap comprising a base 50a and a lateral surface 50b which extends from the base 50a and defines therewith a cavity (see FIG. 17). On the opposite side of the base 50a, the closure 50 has an opening destined to accommodate the mouth 4d of a receptacle 2.

The application of the concave closure 50 is done by axial pressure downwards and a subsequent screwing about the neck 4b of the receptacle 2. For this purpose, the lateral surface 50b of the closure 50 is internally threaded so as to be screwed to the external thread of the neck 4b of the receptacle 2.

Preferably, the closing apparatus 40 is of the rotating carousel type. Alternatively, the closing apparatus 40 may be of a linear type.

The closing apparatus 40 preferably comprises a second isolator 47 adapted to define a second controlled contamination environment 48 having a volume extending from said closing heads 46 to the position assumed by the neck 4b of the receptacles 2 in the closing stations 45.

Figure 14:
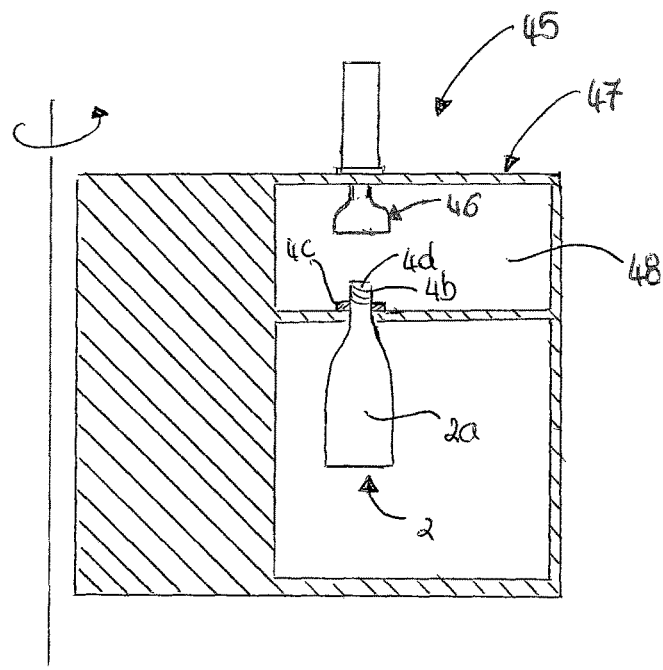
FIG. 14 illustrates a closing station of the bottling plant of FIG. 2, in a partly sectioned view.

In particular, the second controlled contamination environment 48 extends up to containing at least the finish 4c of the receptacles 2 while the body 2a of the receptacles 2 is outside the second environment 48, as illustrated in FIG. 14. In an embodiment, the second controlled contamination environment 48 extends up to containing also a zone just below the finish 4c of the receptacles 2 so that the majority of the body 2a of the receptacles 2 is outside the second environment 48.

In a further embodiment, the closing apparatus 40 comprises at least two distinct units: an application unit 140 of the concave closures 50 to the receptacles 2 and a tightening unit 141 of said closures 50 already applied on the receptacles 2.

In particular, the application unit 140 of the closures 50 is configured for resting and pressing the closures 50 onto the mouth 4d of the receptacles 2.

In the application unit 140 each closure 50 is preferably rested on the mouth 4d of the corresponding receptacle 2 by means of guides (an "on the fly" grip) and is therefore pressed on the mouth 4d by means of the pressure generated by an inclined plane P encountered by the receptacle 2 during the movement thereof.

The application unit 140 for applying the closures preferably comprises a third isolator 147 adapted to define a third controlled contamination environment 148 having a volume that extends into a narrow zone around the neck 4b of the receptacles 2.

Figure 16:
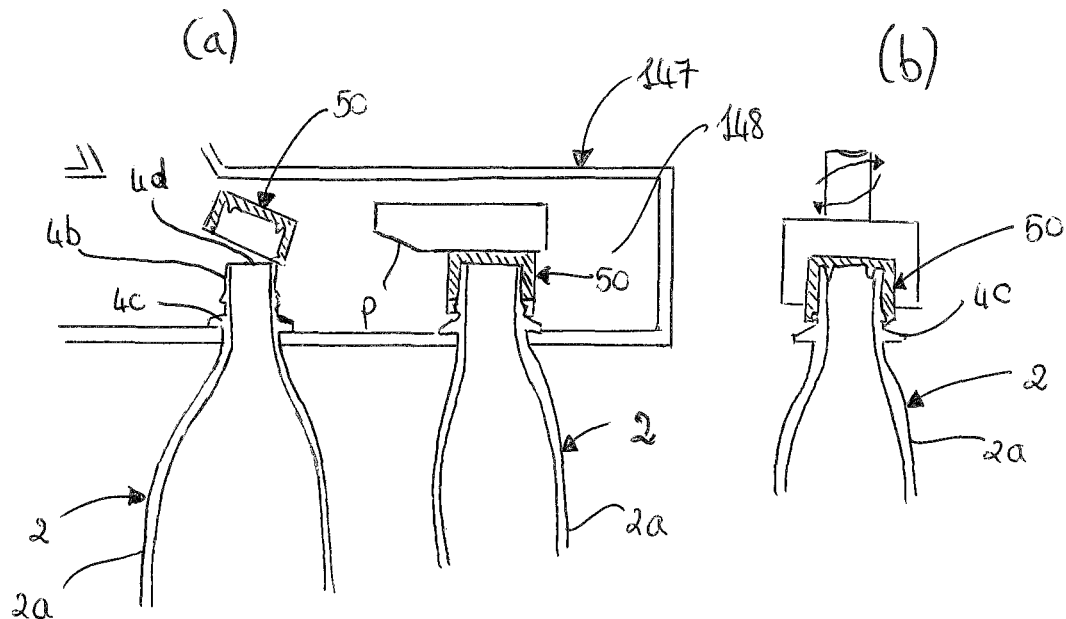
FIGS. 16a-16b respectively illustrate an application step and a blocking step of a closure on a receptacle in the closing apparatus of FIG. 15.

In particular, the third controlled contamination environment 148 extends up to containing at least the finish 4c of the receptacles 2 while the body 2a of the receptacles is outside the third environment 148, as illustrated in FIG. 16. In an embodiment, the third controlled contamination environment 148 extends up to containing also a zone just below the finish 4c, so that the majority of the body 2a of the receptacles 2 is outside the third environment 148.

In the tightening unit 141, each closure 50 is screwed to the neck 4b of the corresponding receptacle 2 in such a way as to seal it and make the seal definitive.

The tightening unit 141 preferably consists of a known-type capper.

Between the application unit 140 and the tightening unit 141 of the closures a receptacle movement system is preferably included, so that reciprocal contact between the receptacles is avoided. For example, this movement system comprises at least a transfer star conveyor bearing a plurality of grippers operatively active on the neck 4b of the receptacles 2 or a plurality of cells.

The movement without reciprocal contact has the aim of preventing the crushing of the receptacles 2 which might cause the raising of the closures 50.

The production method of a sterile receptacle is described in the following. Firstly, a step is included of moulding the parisons 4 starting from granules of thermoplastic material.

Before beginning the moulding, the surfaces of the second moulds 16, which are adapted to go into contact with the parisons 4, are preferably cleaned.

In particular, the dispensing nozzles 18 preferably spray the washing fluid on the external surfaces of the convex portions 16b (male) of the second moulds 16.

The internal surfaces of the concave portions 16a (female) are preferably to be washed.

The dispensing nozzles 18 preferably spray the washing fluid even inside the parisons 4 so as to decontaminate them.

Thereafter the granules are melted and moulded in the second moulds 16 by injection moulding or by compression or injection-compression.

The cleaning step of the surfaces of the second moulds 16 able to come into contact with the parisons 4 is preferably carried out periodically at predetermined and schedulable time intervals (for example even after each moulding cycle).

At the end of the moulding step the parisons 4 are at a temperature of about 100° C., so they are subjected to a thermal conditioning in order to give them a thermal profile that will make them suitable for forming by stretch-blowing.

The parisons 4 preferably also undergo a step of decontamination with a thermally activated sterilising agent.

At the end of the thermal conditioning (and decontamination if required) the parisons 4 are then introduced inside the first moulds 6 of the forming unit 3 for stretch-blowing.

In the transfer from the moulding unit 13 to the thermal conditioning unit 23 and from there to the forming unit 3 the parisons 4 are always externally picked by pickers actively operative on the neck 4b thereof.

The movement of the parisons 4 is done "individually", i.e. each single parison 4 is loaded by a picking organ 14, 15 which can be for example a picker 14 or a picking head 15 from above or a cell of a transfer star conveyor. Movements of the loose parisons are not considered, for example by means of conveyor belts.

In the forming unit 3 the half-moulds 6a, 6b of each mould 6 are in the second configuration for accommodating the corresponding parison 4 inside the housing cavity 7.

Not only the forming but also the decontamination of the parisons 4 occurs inside the first moulds 6.

In the first embodiment, the decontamination occurs by generating plasma outside the housing cavity 7 and blowing the plasma inside the parisons 4.

For example, the generation of plasma takes place near the first moulds 6 starting with the blowing fluid coming from the valve unit 213.

In particular, a pre-blowing step is included, in which the plasma is blown into the parisons 4 at a maximum pressure of about 16 bar. For this purpose, the valve unit 213 enables communication of the inlet 20 of the plasma generator 19 with the primary line 211 bearing the fluid at the maximum pressure of 16 bar.

Following the pre-blowing a true and proper blowing step is included, in which the plasma is blown into the parisons 4 at a maximum pressure of about 40 bar. In this case, the valve unit 213 enables communication of the inlet 20 of the plasma generator 19 with the secondary line 212 bearing the fluid at the maximum pressure of about 40 bar.

At the end of the forming process, the residual gas remaining inside the receptacles 2 is evacuated through the discharge line 214. The generation of plasma can take place downstream of the blowing fluid compression stage 216.

In this case, the compression stage 216 generates the blowing fluid having a maximum pressure of about 8 bar, a fluid that is converted into plasma by the plasma generator 19. This plasma is then further compressed in the two plasma compression stages 221, 222 up to about 40 bar.

During the pre-blowing phase, the valve unit enables communication of the primary line bearing the plasma at a maximum pressure of about 16 bar with the blowing nozzle 10.

Continuing to blow plasma is also possible during the actual blowing phase, setting the secondary line, which bears the plasma at the maximum pressure of about 40 bar, in communication with the relative blowing nozzle 10.

During the pre-blowing phase, in each forming station 5 the blowing nozzle 10 creates a seal on the finish 4c so as to close the mouth of the parison 4 in a tightly sealed manner. The stretching rod 11 is gradually inserted inside the tubular body 4a of the parison 4 until it reaches the bottom thereof. After touching the bottom, the stretching rod 11 continues its linear course so as to stretch the tubular body 4a of the parison 4 until substantially reaching the desired length of the receptacle 2 to be obtained.

During the actual blowing phase, the stretching rod 11 retracts until it emerges from the formed receptacle 2.

An option is included of completing decontamination of the internal walls of the formed receptacle 2 by blowing more plasma inside the latter once forming by stretch-blowing has been completed. Upon completion of the forming process, the residual gas remaining inside the receptacle passes through the blowing nozzle 10 and is evacuated through a discharge line controlled by the valve unit.

In the second embodiment, the sterilisation is done by generating the plasma directly inside the housing cavity 7.

For example, the two joined half-moulds 6a, 6b form the hollow body that envelops the parison 4 in each forming station 5. In particular, the two joined half-moulds 6a, 6b envelop the tubular body 4a of the parison 4.

At this point, the fluid at a pressure higher than the atmospheric pressure is blown into the parison 4. As already mentioned, two steps are included, one for pre-blowing and one for actual blowing.

While the fluid is being blown into the parison 4, a voltage difference is applied between the stretching rod 11 and the joined half-moulds 6a, 6b (forming the hollow body) and the voltage difference is such as to bring about an electrical discharge that leads to the generation of plasma. For example, the voltage difference applied is in the range of 20-30 kV.

In particular, the generation of plasma can take place only during the pre-blowing step or during the subsequent blowing step as well.

The application of the voltage difference between the stretching rod 11 and the joined half-moulds 6a, 6b (forming the hollow body) also preferably takes place after completion of the step of blowing fluid. For this purpose, following the blowing step, the stretching rod 11 is kept inside the formed receptacle 2 for a length of time in the range of 1 to 2 seconds. Plasma generation is comprised also following the blowing step and sterilisation is completed by acting directly upon the formed receptacle 2.

For example, following the blowing step, the residual gas is discharged to the exterior of the formed receptacle 2 and then the voltage difference is applied between the stretching rod 11 and the joined half-moulds 6a, 6b. The generation of plasma in this step is decidedly simple, for the fluid present in the formed receptacle 2 is at atmospheric pressure.

Alternatively, it is possible to generate plasma only during the pre-blowing step or for part of the pre-blowing step.

As indicated above, it is also possible to generate the plasma as soon as the parison 4 is loaded into the housing cavity 7 and prior to the blowing step, using the air at atmospheric pressure already present in the housing cavity 7.

In the embodiment in which the hollow body 225 is tubular, after or during the joining of the two moulds 6a, 6b, movement of the hollow tubular body 225 takes place, bringing it from the rest position to the operating position. The hollow tubular body 225 is preferably coaxial with the housing cavity 7 and is inserted into the housing cavity 7 through a slot (not illustrated) afforded in the first mould 6. For example, this slot is afforded in one of the two bases of the first mould 6.

In particular, the hollow tubular body 225 is moved linearly along the longitudinal axis A of the housing cavity 7 until it partially or entirely envelops the tubular body 4a of the parison 4.

A voltage difference is subsequently applied between the stretching rod 11 and the hollow tubular body 225 and the voltage difference is such as to bring about an electrical discharge that leads to the generation of plasma. For example, the voltage difference applied is in the range of 20-30 kV.

At the same time, the fluid at a pressure higher than the atmospheric pressure, preferably about 8 bar, can be blown into the parison 4. The plasma generated makes it possible to sterilise the parison 4.

Subsequently, the hollow tubular body 225 is brought back to the rest position. Advantageously, the overall duration of the movements of the hollow tubular body 225 (from the rest position to the operating position, and vice versa) is several tenths of a second.

Forming of the receptacle 2 proceeds by blowing fluid at a maximum pressure of about 40 bar in the parison 4.

In particular, during the pre-blowing process, the stretching rod 11 continues its gradual penetration of the parison 4 until reaching the bottom thereof. After touching the bottom, the stretching rod 11 continues its linear course so as to stretch the tubular body 4a of the parison 4 until substantially reaching the desired length of the receptacle 2 to be obtained.

Following the pre-blowing a true and proper step of blowing takes place.

There is a step for applying a voltage difference between the stretching rod 11 and the joined half-moulds 6a, 6b preferably following the blowing step. For this purpose, following the blowing step, the stretching rod 11 is kept inside the parison 4 for a length of time in the range of 1 to 2 seconds.

By activating the plasma also following the blowing step, sterilisation is completed, acting directly on the formed receptacle 2.

For example, following the blowing step, the residual gas is discharged to the exterior of the formed receptacle 2 and then the voltage difference is applied between the stretching rod 11 and the joined half-moulds 6a, 6b. The generation of plasma in this step is decidedly simpler, for the fluid present in the formed receptacle is at atmospheric pressure.

If the step for generating plasma after the blowing step is not included, the stretching rod 11 will already begin to retract during the blowing step.

In the third embodiment, the sterilisation of the parison 4 in the first mould 6 is done by nebulising the sterilising fluid.

In the fourth embodiment, the sterilisation of the parison 4 includes sending radiations through the stretching rod 11. These radiations exit from the first holed end 11a and strike the internal walls of the parison 4.

In outlet from the forming unit 3, the receptacles 2 are transferred to the filling apparatus 30.

In particular, the neck 4b of the receptacles 2 is maintained in a sterile condition thanks to the presence of the first isolator 37, which in fact isolates the volume in which the filling takes place—a volume having an extension such as to comprise the neck 4b of the receptacles 2 and the filling nozzles 36 but not the body 2a of the receptacles 2.

Once filled, the receptacles 2 pass on to the closing apparatus 40, in which the neck 4b of each receptacle 2 is maintained in a sterile condition due to the presence of the second isolator 47, which in face isolates the volume in which the closing of the receptacles 2 takes place—a volume having an extension such as to comprise the neck 4b of the receptacles 2 and the capping heads 46 but not the body of the receptacles 2.

The first isolator 37 and the second isolator 47 are preferably in communication with one another so as to constitute a single isolator confined to the zone of the neck 4b of the receptacles 2.

Figure 15:
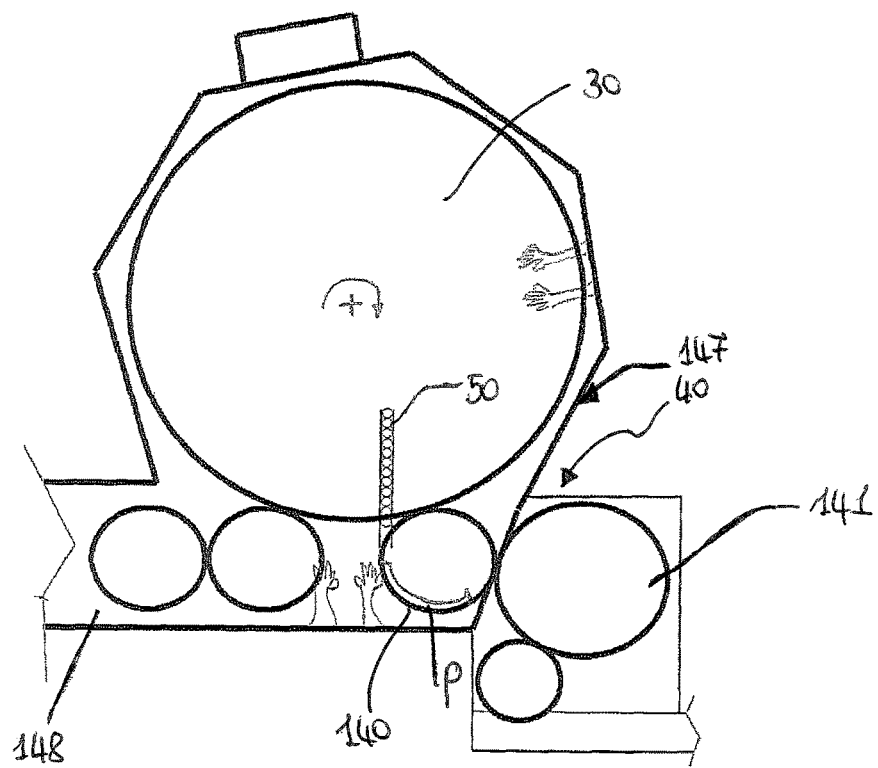
FIG. 15 illustrates a variant of the closing apparatus of the bottling plant of FIG. 2, in a schematic plan view.

In the preferred embodiment, illustrated in FIG. 15, the closing of the receptacles 40 is done in two steps. In a first step, illustrated in FIG. 16a, the closure 50 is rested on the mouth 4d of the receptacle 2 (gripped "on the fly") and pressed on the mouth 4d. This first step takes place in the third controlled contamination environment 148. The closure 50 creates in this way a temporary physical barrier to the inlet of contaminants in the receptacle 2, so that the receptacle 2 can be taken out of the third controlled contamination environment 148 without any risk of contamination.

In the second step, illustrated in FIG. 16b, the closure 50 is screwed on the neck 4b of the receptacle 2 and seals it. The second step takes place after the first step, in a traditional capper 141, i.e. not aseptic (thus in a non-sterile environment).

From the description the characteristics of the production apparatus of sterile receptacles, the bottling plant comprising the apparatus and the production method of a sterile receptacle according to the present invention are clear, as are the advantages.

Firstly, having integrated the parison moulding unit inside the production apparatus of the receptacles together with the fact of having predisposed the sterilisation of the parisons directly on the blower enables abandoning the structural complexity of the "aseptic" blower with an isolator, along with all the members operating at the interface thereof (e.g. sealing systems between the sterile zone and the external environment, confinement of the stretching rod, sterilisation system of the blown air circuit, etc.).

In fact, the integration of the moulding unit enables keeping under control the contamination of the parisons during generation thereof and delivering parisons to the blower with a low level of contamination. This is also due to the high temperature of the parisons in outlet from the moulding unit, which is about 100° C.

The cleaning of the moulds of the moulding unit, in particular the males, enables avoiding contaminations of the internal surfaces of the parisons.

The manipulation of the parisons only by picking organs operating on the external surfaces of the parisons and the maintaining of the parisons in an ultra-clean environment also aids in this.

The parisons in outlet from the moulding unit cannot be considered sterile, but reach a high level of cleanliness which enables simplifying the following sterilisation step, limiting the number of critical parameters for maintaining the aseptic conditions. For example, two D-value reductions can be used instead of the four/six D-value reductions normally required in an aseptic line.

This relaxing of the sterility performance enables carrying out more rapid sterilisations.

Of particular relevance is the sterilisation of the inside of the blower with plasma.

In fact, in the first embodiment, by generating the plasma at a pressure higher than the atmospheric pressure and using it as a substitution for the blowing fluid, the parison can be moulded and decontaminated at the same time.

In the first embodiment, the proposed apparatus is compact and structurally simple, in that it requires the sole presence of a plasma generator, in addition to the normal elements already present in a forming device for forming by stretch-blowing (compressor, valve unit, mould, stretching rod, blowing nozzle, etc.).

By positioning the plasma generator near the blowing nozzle greater efficiency is also achieved due to the reduction of the pathway for radical species (commonly known by the acronym R.O.S. for "Reactive Oxygen Species") present in the plasma, which are short-lived.

The incorporation of the plasma generator in the valve unit makes for an even more compact solution.

The discharge line, being made in parallel with the plasma generator, prevents drops in pressure due to evacuation of the residual gas to the plasma generator.

If the plasma generator operates with relatively low inlet pressures (maximum 8 bar, approximately), the overall structural design is further simplified.

Further, owing to the fact that the blowing nozzle creates a tight seal on the finish, the plasma also flows over the external surface of the neck of the parison and thus sterilises it.

In the second embodiment, the plasma is generated directly inside the housing cavity of the parison by applying a potential difference between two electrodes.

By using as electrodes the stretching rod and the first mould—and therefore no additional element—the advantage is obvious in terms of compactness and structural simplicity.

By using as electrodes the stretching rod and the hollow tubular body, the distance between the electrodes is shorter so that the volume of dielectric between the electrodes facilitates plasma ignition.

Generation of the plasma directly in the housing cavity, prior to forming or during part of the pre-blowing step and therefore with decidedly lower pressures (even at atmospheric pressure) is further relatively easy. In fact, it is a known fact that an increase in the pressure of the incoming fluid makes it more difficult to activate the plasma because it increases the resistance of the fluid (which functions as a dielectric) to the discharge.

Moreover, the realization of the hollow tubular body as a metal cage offers the advantage of reducing movement time for moving it (given that the cage is lighter than a body having solid walls), thus making it possible to begin sterilisation promptly prior to forming and making it possible to move the cage away quickly even before the beginning of the pre-blowing step. In fact, the total time required for movement of the metal cage consists of several tenths of a second. Furthermore, by generating the plasma at atmospheric pressure after the blowing step (by means of the application of a voltage difference between the stretching rod and the half-moulds), sterilisation is also completed on the formed receptacle.

In a case of use of plasma (first and second embodiment), sterilisation and forming of the parison are inseparable processes, so no further measures are required to maintain environment contamination below the desired level: in fact, the receptacle is formed in conditions of sterility thanks to the plasma blown into it or generated therein. Therefore, the overall packaging times are reduced because of the simultaneous execution of two steps, i.e.,—sterilisation and forming—which until now had always been performed sequentially.

Since the sterilisation process is carried out in the blowing cavity,—before, during or after the blowing itself—a "traditional" blower can be used. This "conventional" blower thus becomes a blower/steriliser.

Sterilisation cycles for sterilising the environment and the blown air are no longer necessary.

The steriliser for sterilising the parisons upstream of the blower can thus be eliminated, in particular for the packaging of beverages having high acidity.

Further, the use of plasma is still more advantageous with respect to the use of chemical means or radiations as it makes it possible to reduce sterilisation time, to avoid the forming of residues of peroxides in the receptacle, and to sterilise the internal surface and the external neck of the parison and the receptacle in a substantially uniform manner.

Note that the moulding unit and the thermal conditioning unit, as well as any eventual intermediate transfer unit, are arranged in an ultra-clean environment which maintains the contamination of the parisons under control up to the step of sterilising-forming.

The simplification of the initial steps of the bottling line—moulding and stretch-blowing—is repeated in the following units too. In fact, both the filling and the capping of the receptacles include predisposing restricted sterile volumes about the zone of the neck.

The sterile zone is therefore present only downstream of the blower.

In particular, at the end of the forming the receptacle is internally sterile and in the zone of the neck. By predisposing a first isolator in the filling apparatus and confining it only to the neck zone, any contaminants present on the external surfaces of the receptacles are prevented from reaching into the neck inside the receptacles.

The same is done for the receptacle closing apparatus.

The embodiment in which the closing apparatus is subdivided into the application and blocking units of the closures has a further advantage.

The resting and the subsequent pressure of the closures on the mouth of the receptacles in a controlled contamination zone enables preserving the internal sterility, so that the receptacles can be blocked by screwing the closures outside the zone (i.e. in a non-sterile zone), in the example in a traditional capper (not aseptic).

This too aids in further reducing the sterile volumes and, consequently, the sterilisation times.

The invention claimed is:

1. Apparatus (1) for producing sterile receptacles (2), comprising:
    a stretch-blowing forming unit (3) having a plurality of forming stations (5) in each of which two half-moulds (6*a*, 6*b*) are arranged that can be moved towards one another to define at least one housing cavity (7) for housing a parison (4) made of thermoplastic material;
    a moulding unit (13) for moulding parisons (4) starting from granules of thermoplastic material, said moulding unit (13) being placed upstream of said forming unit (3);
    a plurality of sterilisation devices (12), each of which is situated in one of said forming stations (5) so as to sterilise the parisons (4) that arrive in the corresponding housing cavities (7),
characterised in that said moulding unit (13) for moulding the parisons (4) comprises:
    a plurality of moulding stations in each of which a mould (16) is arranged comprising a concave portion (16*a*) and a convex portion (16*b*) insertable in said concave portion (16*a*);
means for cleaning (17) surfaces of said moulds (16) adapted to come into contact with said parisons (4),
wherein each sterilisation device (12) comprises a plasma generator (19) operatively active on the corresponding housing cavity (7).

2. Apparatus (1) according to claim 1, wherein said means for cleaning (17) comprise nozzles (18) for dispensing a washing fluid which are arranged so as to dispense jets of washing fluid at least onto outer surfaces of the convex portions (16*b*) of said moulds (16).

3. Apparatus (1) according to claim 1, wherein each sterilisation device (12) consists of a nozzle for nebulising a sterilising fluid, said nozzle pertaining to the corresponding housing cavity (7) so as to treat the parison (4) contained therein.

4. Apparatus (1) according to claim 1, further comprising a thermal conditioning unit (23) interposed between said moulding unit (13) and said forming unit (3) so that the parisons (4) leaving said thermal conditioning unit (23) have a predefined thermal profile adapted to allow forming by stretch-blowing.

5. Apparatus (1) according to claim 4, wherein said moulding unit (13) and said thermal conditioning unit (23) are arranged in an ultra-clean environment (24), i.e. in a volume that is separated from an external environment by means of a physical separation that has the purpose of limiting the entrance of contaminants from the external environment.

6. Bottling plant (100) comprising:
    a production apparatus (1) of sterile receptacles (2) according to claim 1;
    a filling apparatus (30) of formed receptacles (2) comprising a plurality of filling stations (35) and as many filling nozzles (36) each of which is positioned at one of said filling stations (35);
    a closing apparatus (40) of filled receptacles (2) comprising a plurality of closing stations (45) and as many closing heads (46) each of which is positioned at one of said closing stations (45).

7. Bottling plant (100) according to claim 6, wherein said filling apparatus (30) comprises a first isolator (37) adapted to define a first controlled contamination environment (38) having a volume extending from said filling nozzles (36) to the position assumed by the neck (4*b*) of the receptacles (2) in said filling stations (35).

8. Bottling plant (100) according to claim 6, wherein said closing apparatus (40) comprises a second isolator (47) adapted to define a second controlled contamination environment (48) having a volume extending from said closing heads (46) to the position assumed by the neck (4*b*) of the receptacles (2) in said closing stations (45).

9. Bottling plant (100) according to claim 6, wherein said closing apparatus (40) comprises:
    an application unit (140) of closures (50) configured to rest and press onto each receptacle (2) a concave closure (50);
    a tightening unit (141) for tightening the closures (50) configured to screw each concave closure (50) to the neck (4*b*) of the corresponding receptacle (2), said application unit (140) for applying the closures (50) comprising a third isolator (147) adapted to define a third controlled contamination environment (148) having a volume that extends into a narrow zone around the neck (4*b*) of the receptacles (2).

10. Bottling plant (100) according to claim 9, wherein said tightening unit (141) is a non-aseptic capper.

* * * * *